United States Patent [19]
Thusoo et al.

[11] Patent Number: 5,790,826
[45] Date of Patent: Aug. 4, 1998

[54] REDUCED REGISTER-DEPENDENCY CHECKING FOR PAIRED-INSTRUCTION DISPATCH IN A SUPERSCALAR PROCESSOR WITH PARTIAL REGISTER WRITES

[75] Inventors: Shalesh Thusoo, Milpitas; Gene Shen, Mountain View; James S. Blomgren, San Jose, all of Calif.

[73] Assignee: S3 Incorporated, Santa Clara, Calif.

[21] Appl. No.: 618,636

[22] Filed: Mar. 19, 1996

[51] Int. Cl.$^6$ ................................ G06F 9/38; G06F 9/28
[52] U.S. Cl. ................... 395/392; 395/382; 395/388; 395/391; 395/394; 395/800.23
[58] Field of Search ........................ 395/390–394, 395/566–568, 382, 385, 388, 591, 24, 800.23, 800.41, 800.42

[56] References Cited

U.S. PATENT DOCUMENTS

| | | | |
|---|---|---|---|
| 5,150,469 | 9/1992 | Jouppi | 395/591 |
| 5,269,007 | 12/1993 | Hanawa et al. | 395/394 |
| 5,416,912 | 5/1995 | Saini | 395/591 |
| 5,416,913 | 5/1995 | Grochowski et al. | 395/392 |
| 5,475,824 | 12/1995 | Grochowski et al. | 395/382 |
| 5,559,975 | 9/1996 | Christie et al. | 395/571 |
| 5,600,848 | 2/1997 | Sproull et al. | 395/800.42 |
| 5,603,047 | 2/1997 | Caulk, Jr. | 395/800.23 |
| 5,655,141 | 8/1997 | Ogden et al. | 395/800.23 |

*Primary Examiner*—Parshotam S. Lall
*Assistant Examiner*—Bharat Barot
*Attorney, Agent, or Firm*—Stuart T. Auvinen

[57] ABSTRACT

The dispatch unit of a superscalar processor checks for register dependencies among instructions to be issued together as a group. The first instruction's destination register is compared to the following instructions' sources, but the destinations of following instructions are not checked with the first instruction's destination. Instead, instructions with destination-destination dependencies are dispatched together as a group. These instructions flow down the pipelines. At the end of the pipelines the destinations are compared. If the destinations match then the results are merged together and written to the register. When instructions write to only a portion of the register, merging ensures that the correct portions of the register are written by the appropriate instructions in the group. Thus older code which performs partial-register writes can benefit from superscalar processing by dispatching the instructions together as a group and then merging the writes together at the end of the pipelines. The dispatch and decode stage, which is often a critical path on the processor, is reduced in complexity by not checking for destination-register dependencies. Performance increases because more kinds of instructions can be dispatched together in a group, increasing the use of the superscalar features.

20 Claims, 6 Drawing Sheets

REDUCED REGISTER-DEPENDENCY CHECKING FOR PAIRED-INSTRUCTION DISPATCH IN A SUPERSCALAR PROCESSOR WITH PARTIAL REGISTER WRITES

BACKGROUND OF THE INVENTION

1. Field of the Invention

This invention relates to superscalar processors, and more particularly to dispatching together a pair of instructions despite register dependencies.

2. Description of the Related Art

Superscalar processors can execute two or more instructions in a single clock period. Processors are usually pipelined into several stages, and superscalar processors thus have several pipelines. At the beginning of the pipeline an instruction is decoded and dispatched to one of the pipelines. Superscalar processors can decode or dispatch two or more instructions in the same clock cycle. At the end of the pipelines the instructions write their results to a destination register in a register file. The result typically is generated from operands in one or more source registers in the register file.

Sometimes the destination register from a first instruction is the same register as the source register from a second instruction. This is known as a source-destination register dependency. The second instruction must wait to read the source register until the first instruction writes its result to the destination register. When both the first and the second instructions are ready to be dispatched together, the second instruction is typically prevented from being dispatched until the cycle after the first instruction is dispatched. Destination-source dependencies, where the destination of the second instruction is the source of the first instruction, may also prevent the instructions from being dispatched together for some systems.

Another dependency is the destination-destination dependency. The destination register of the first instruction is also written as the destination of the second register. The first instruction appears to be redundant, since the second instruction over-writes the first instruction's result. However, each instruction may write just a portion of the register. The first instruction is not redundant when it writes to a different part of the second instruction's destination register. Older 16-bit or 8-bit code is an example of such partial writes—the first instruction writes to the lower 8 bits of a destination register while the second instruction writes to the next 8 bits of the same destination register.

These complexities have led others to prevent the second instruction from being dispatched with the first instruction when any kind of register dependency is found. For example, Grochowski et al. in U.S. Pat. No. 5,416,913, assigned to Intel Corp., constructs an array of comparators to check for all combinations of register dependency, including destination-source and destination-destination. Only independent instructions are permitted to enter the parallel pipelines at the same time. Writing to any part of a register is treated the same as if the entire register is written. Thus older 16-bit and 8-bit programs do not benefit from the superscalar pipelines.

Unfortunately, checking for all possible combinations of register dependencies is slow and can increase critical paths of the processor. This is especially a problem since dependency checking is performed in the decode stage, which is one of the most critical stages of a processor, especially for complex instruction sets which are hard to decode. Performance is also reduced because instructions are not paired when any kind of dependency is detected.

FIG. 1 is a diagram of prior-art register-dependency checking before a pair of instructions are dispatched. Dispatch compare logic 10 determines if a register dependency exists before instructions are dispatched to either the A or the B pipelines. The destination 12 of the first instruction in the A pipeline is compared by comparators 20, 22, 24 to the destination 14, first source 16, and second source 18 for the second instruction. If any of comparators 20, 22, 24 detect a match, the second instruction is prevented from being dispatched into the B pipeline when the first instruction is being dispatched to the A pipeline. OR gate 26 asserts a NOT PAIRED signal to indicate that the first and second instructions cannot be paired together because of the dependency.

FIG. 2 is a pipeline diagram of a superscalar processor using prior-art dependency checking at the beginning of the pipelines. Dispatch compare logic 10 receives the destination register specifier from the first instruction in the A pipeline and compares it to the destination and source register specifiers for the second instruction in the B pipeline. When a match is detected, the second instruction is inhibited from completing decode stage 31 of the B pipeline and entering address generate stage 33 of the B pipeline. Instructions in the A pipeline proceed from decode stage 32, to address generate stage 34, cache access stage 36, memory and execute stage 38, and finally to write-back stage 40 where the result is written to register file 30. Instructions in the B pipeline proceed from decode stage 31 to address generate stage 33 when dispatch compare logic 10 does not assert NOT_PAIRED. Instructions then proceed to cache access stage 35, memory and execute stage 37, and finally to write-back stage 39 where the result of the second instruction is written to register file 30.

What is desired is a superscalar processor that allows instructions with some kinds of dependencies to be dispatched together. It is desired to improve performance by dispatching more kinds of instructions together as a superscalar pair. It is also desired to reduce critical delay paths in the instruction decode stage by reducing dependency checking in the decode stage. It is further desired to more precisely handle register dependencies when registers are only partially written. It is desired to extend the benefits of superscalar execution to older 16-bit code which performs partial writes to 32-bit registers.

SUMMARY OF THE INVENTION

A superscalar processor executes two instructions in parallel. An instruction decode and dispatch unit decodes a pair of instructions and dispatches the pair of instructions. The instruction pair includes a first instruction and a second instruction that follows the first instruction in an instruction stream. A destination-source compare means, in the instruction decode and dispatch unit, compares a first destination of the first instruction in the instruction pair to a source of the second instruction in the instruction pair.

A first pipeline receives the first instruction from the instruction decode and dispatch unit. The first pipeline processes the first instruction and generates a first result. A second pipeline receives the second instruction from the instruction decode and dispatch unit. The second pipeline processes the second instruction in parallel with the first pipeline processing the first instruction. The second pipeline generates a second result for the second instruction.

A register file stores a plurality of results and operands. A destination compare means is coupled to the first pipeline and to the second pipeline. It signals a destination match when the first destination of the first instruction is to the same register in the register file as a second destination of the second instruction.

A destination register write means is coupled to receive the first result from the first pipeline and to receive the second result from the second pipeline. The destination register write means:

(a) writes the first result to the first destination in the register file and writes the second result to the second destination in the register file when the destination match is not signaled, but (b) writes the second result to the second destination in the register file when the destination match is signaled and discards the first result.

Thus the instruction pair is dispatched and processed in parallel even when the destination match occurs.

In further aspects of the invention the instruction decode and dispatch unit also has an inhibit means which is responsive to the destination-source compare means. It cancels the second instruction when the first destination of the first instruction is the same register as the source of the second instruction. The second instruction is then dispatched as a first instruction of a following clock cycle. Thus the second instruction is inhibited from pairing with the first instruction when the first destination matches the source.

In other aspects a size compare means is coupled to the second pipeline. It indicates when only a second portion of a destination register in the register file is written by the second result of the second instruction. A write merge means in the destination register write means is responsive to the size compare means. It writes the second result to the second portion of the destination register but writes a first portion of the first result to the destination register when the destination match is signaled. The first portion excludes the second portion. Thus portions of the first result are merged with the second result when the second result is written to only a portion of the destination register and the destination match is signaled.

In still further aspects the destination register has 32 data bits, while the second portion is (a) a most-significant 16 bits of the 32 data bits,
(b) a least-significant 8 bits of the 32 data bits, or
(c) a most-significant 8 bits of a least-significant 16 bits of the 32 data bits.

DETAILED DESCRIPTION

The present invention relates to an improvement in superscalar processors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
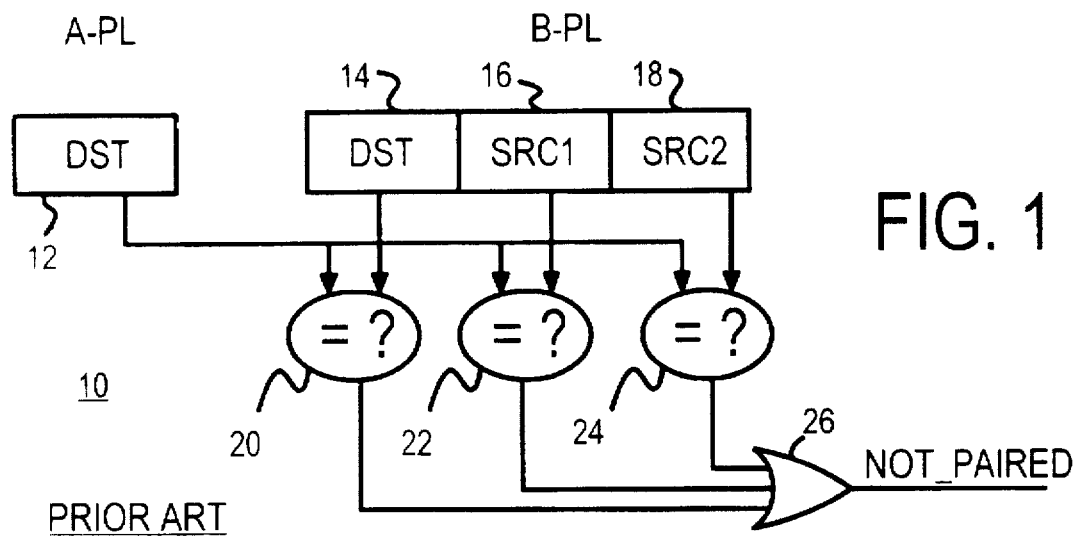
FIG. 1 is a diagram of prior-art register-dependency checking before a pair of instructions are dispatched.
Figure 2:
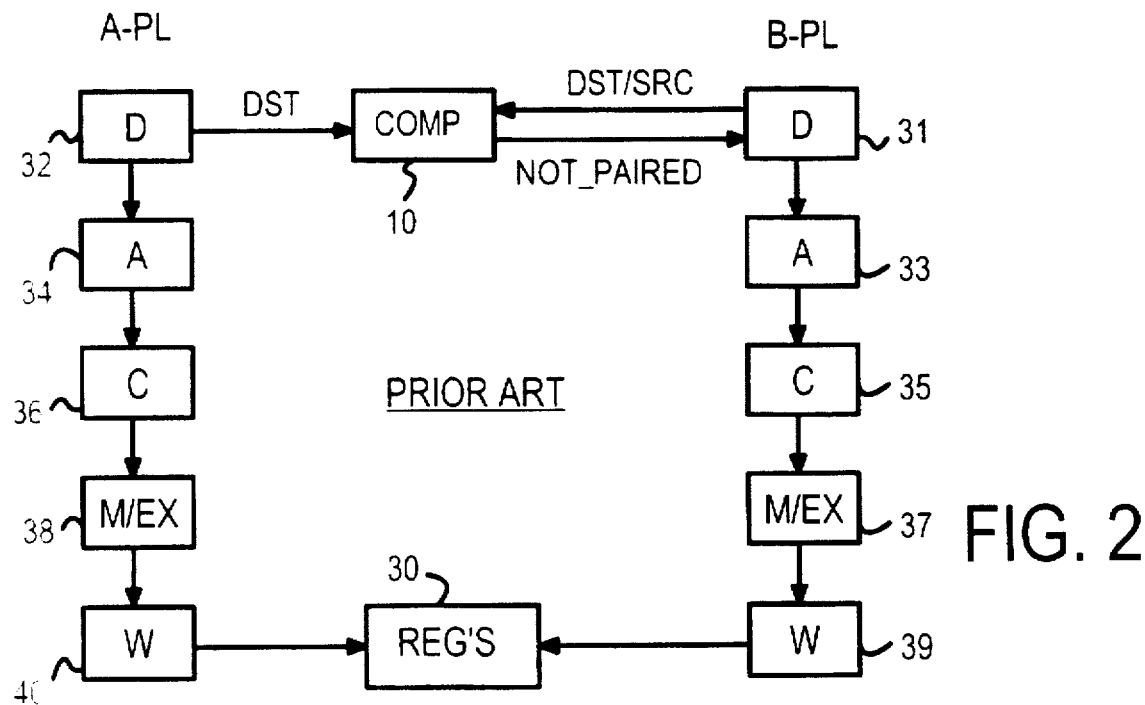
FIG. 2 is a pipeline diagram of a superscalar processor using prior-art dependency checking at the beginning of the pipelines.
Figure 3:
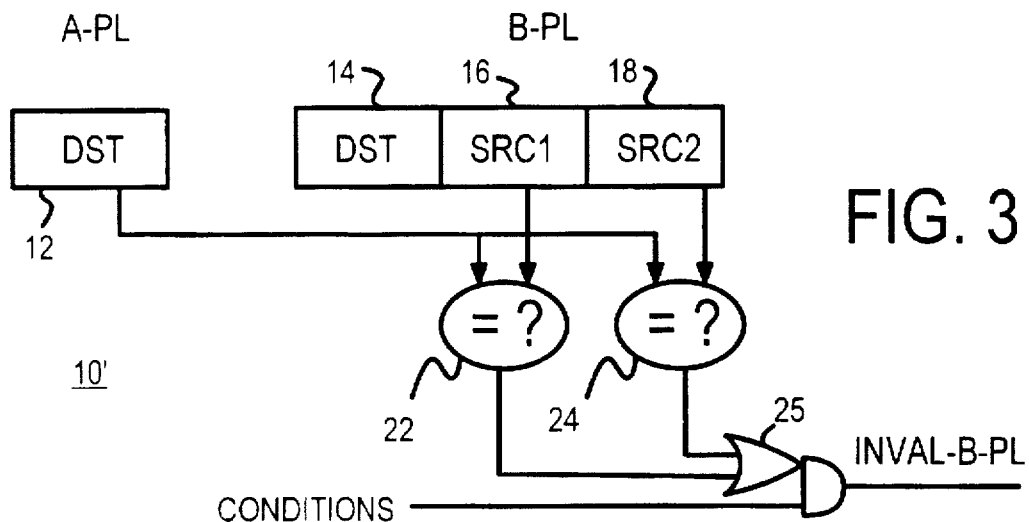
FIG. 3 is a diagram of reduced dependency checking for superscalar dispatch.

FIG. 3 is a diagram of reduced dependency checking for superscalar dispatch. Dispatch compare logic 10' checks for dependencies between source and destination, but not between two destinations as in the prior-art of FIG. 1. Destination 12 of the first instruction in the A pipeline is compared to first source 16 and second source 18 of the second instruction in the B pipeline. When comparators 22, 24 detect a destination-source match, OR-AND gate 25 signals to invalidate the second instruction in the B pipeline when certain conditions are met. The conditions are used to allow pairing for some types of destination-source dependencies as is explained later for the destination-source embodiment. The use of conditions into OR-AND gate 25 is optional.

Destination 12, first source 16, and second source 18 are specifiers which identify one of the registers in register file 30. Specifiers are often included within the instruction word after the opcode part of the instruction word. When register file 30 has 16 registers, a four-bit specifier is used. A 32-register file requires a five-bit specifier. Specifiers may also be used to indicate partial register writes. Register specifiers are sometimes assumed implicitly from the instruction opcode.

Figure 4:
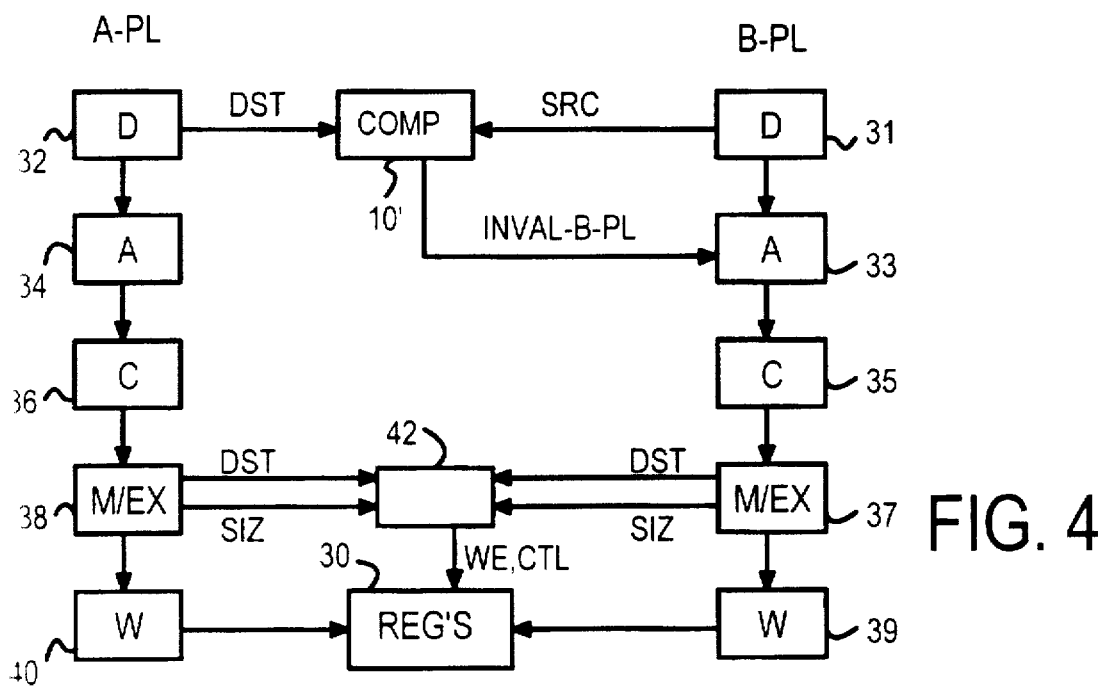
FIG. 4 is a pipeline diagram of a superscalar processor using reduced dependency checking at the beginning of the pipelines and merged writes at the end of the pipelines.

FIG. 4 is a pipeline diagram of a superscalar processor using reduced dependency checking at the beginning of the pipelines and merged writes at the end of the pipelines. Dispatch compare logic 10' receives the destination register specifier from the first instruction in the A pipeline and compares it to the source register specifiers for the second instruction in the B pipeline. When a match is detected, the second instruction is canceled or invalidated in the second stage, address generate stage 33 of the B pipeline. Instructions in the A pipeline proceed from decode stage 32, to address generate stage 34, cache access stage 36, memory and execute stage 38, and finally to write-back stage 40 where the result is written to register file 30. Instructions in the B pipeline proceed from decode stage 31, to address generate stage 33 and then to cache access stage 35 when dispatch compare logic 10' does not assert INAVL__B__PL. Instructions then proceed from cache access stage 35 to memory and execute stage 37, and finally to write-back stage 39 where the result of the second instruction is written to register file 30.

Since the destination of the first instruction in the A pipeline is not compared to the destination of the second instruction in the B pipeline, a pair of dispatched instructions can have a destination-destination dependency. Instruction pairs with these dependencies are allowed to flow down the pipelines and be processed in parallel. The destination specifiers for instructions also flow down the pipelines with the instruction pair. Once the dispatched pair of instructions reach the memory and execute stages 38, 37, the destination specifiers of the two instructions in the A and B pipelines are compared by register-write merge logic 42. When the destination of the instruction in the A pipeline in stage 38 matches the destination of the instruction in stage 37 of the B pipeline, a merged write can occur.

In the merged write, the instruction in the A pipeline and the instruction in the B pipeline both write to the same register in register file 30, although each instruction writes to a portion of the same register. Register-write merge logic 42 also receives size information from each pipeline. This size information indicates which bytes of the destination register are to be written. In some embodiments this size information is encoded, while in other embodiments the size information is decoded into byte enables. Bytes that are written by the second instruction in write-back stage 39 of the B pipeline normally take priority and are written to register file 30. The corresponding bytes in the first instruction in the A pipeline are discarded and not written. This preserves instruction order since the second instruction's result overwrites the first instruction's results when the bytes being written overlap.

However, bytes that are not written by the second instruction in the B pipeline may be written by the first instruction in the A pipeline. Register-write merge logic 42 combines the byte enables from the first and second instructions in the A and B pipelines to perform a merged write. Register-write merge logic 42 also controls muxing logic to select the correct bytes of the results from the first and second instructions for writing to the same destination register in register file 30.

Figure 5:
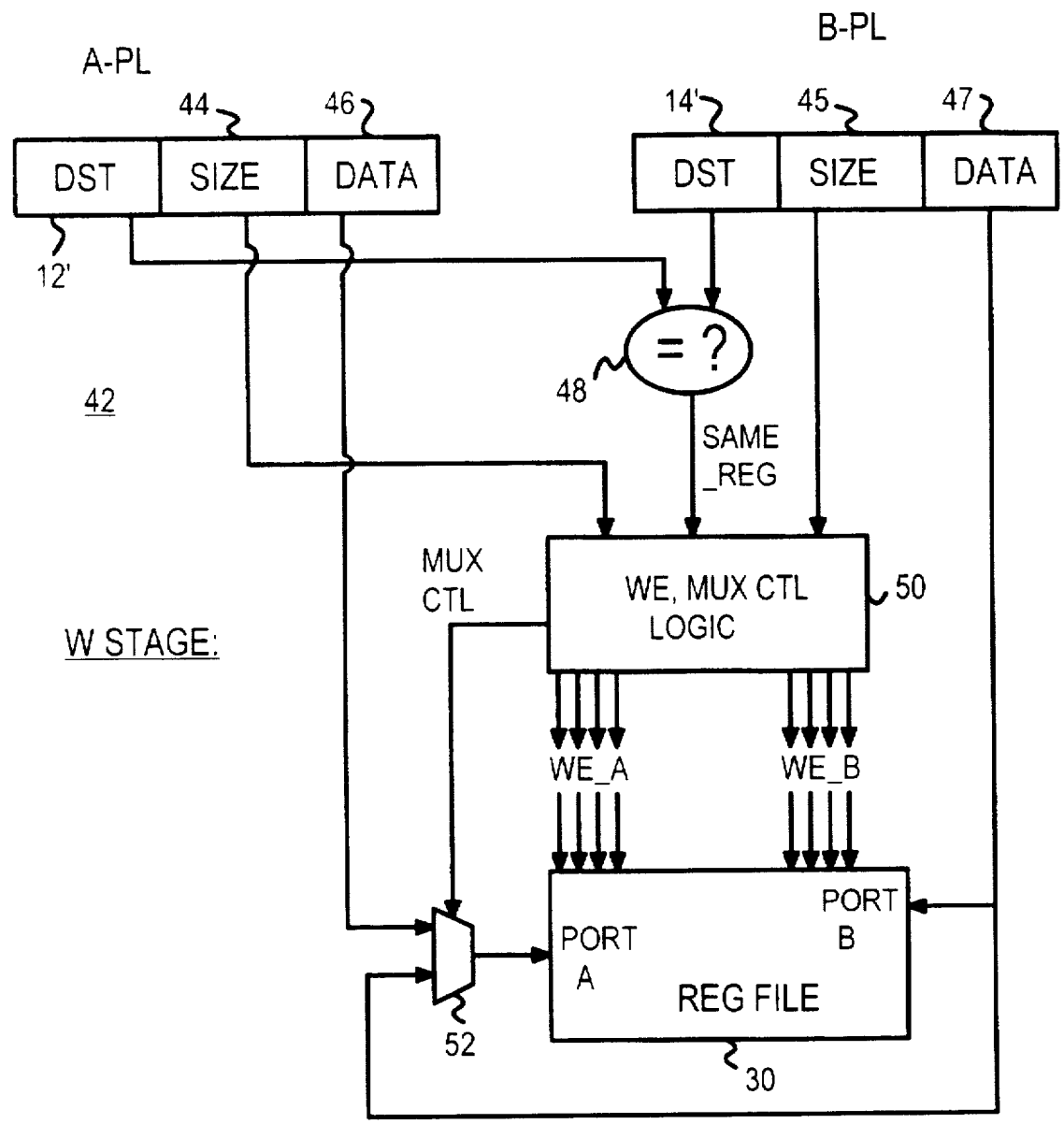
FIG. 5 shows in detail register-write merge logic for resolving destination-destination dependencies at the end of the pipelines.

FIG. 5 shows in detail register-write merge logic 42 for resolving destination-destination dependencies at the end of the pipelines. Destinations 12, 14 from decode stages 32, 31 of the A and B pipelines are not initially compared but instead flow down the pipelines to the memory and execute stages 28, 37 where they are compared by comparator 48. When comparator 48 determines that the destinations are different, signal SAME_REG is negated and each result is separately written to different destination registers in register file 30.

Register file 30 has at least two write ports so that two results may be written simultaneously each clock cycle. When the destinations do not match, as indicated by SAME_REG being low, result data 46 from the first instruction in the A pipeline is written to port A of register file 30. Result data 47 from the second instruction in the B pipeline is simultaneously written to a different destination register in register file 30 through port B. Mux 52 selects result data 46 from the A pipeline when comparator 48 determines that the destination specifiers 12', 14' do not match.

When comparator 48 determines that register specifiers 12', 14' match, SAME_REG is asserted to indicate that both instructions in the A and B pipelines are writing to the same destination register. If both instructions are writing to the entire register, as indicated by size fields 44, 45, then the first instruction's result data 46 is discarded and the second instruction's result data 47 is written to the port A of register file 30 through mux 52. However, if the second instruction has an exception, the second instruction must be canceled and thus the second instruction's result data 47 is discarded while the first instruction's result data 46 is written to register file 30 through mux 52. When the first instruction generates an exception, result data 47 and result data 46 are discarded and no merge occurs.

Merged writes can occur when SAME_REG is active and at least one of the size fields 44, 45 indicate that less than the entire register is to be written. Write-enable and mux control logic 50 then compares the portions of the register being written by each instruction and generates mux control to mux 52 to select portions of result data 46 from the first instruction and other portions from result data 47 from the second instruction so that the two results are merged together and both written to register file 30 through port A.

Write-enable and mux control logic 50 also generates appropriate write enables for ports A and B. The write enables depend on size fields 44, 45. When SAME_REG is active a merged write occurs, only the write enables for port A are used.

WRITES TO LESS THAN THE FULL-SIZE REGISTER—FIG. 6

The x86 CISC architecture provides backward compatibility with older programs or code. Newer 32-bit processors execute 32-bit code which usually write all 32 bits of a register. However, these newer 32-bit processors must also execute older 16-bit and even 8-bit code. When executing 16-bit code, only a 16-bit portion of the 32-bit register is written.

Figure 6:
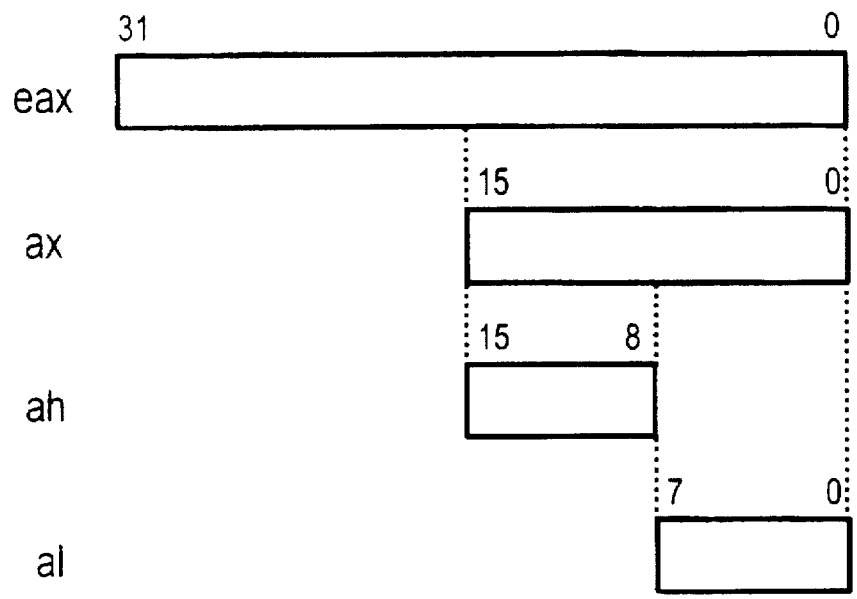
FIG. 6 shows how different portions of the 32-bit register "a" are designated for partial register writes.

FIG. 6 shows how different portions of the 32-bit register "a" are designated for partial register writes. The x86 architecture designates partial-register writes with a shorthand notation often used in assembly-language programming. The full-size 32-bit registers are designated by the letters a, b, c, d. FIG. 6 shows four partial writes to register "a". A full 32-bit write to the 32-bit "a" register is designated eax, for an extended "a" register write. The 16-bit "a" register is designated ax. The x86 architecture was 'extended' from 16 to 32 bits and thus the designation 'extended' register for the full-size 32-bit register. Older 16-bit code can perform only a 16-bit write to the lower 16 bits of the register, designated ax. Code can also write to either the upper or lower byte of the 16-bit ax 'register'. Writing to the low byte of register "a" is designated "al" for a-low, while writing to the upper byte of the low 16 bits of ax is designated "ah" for a-high.

A write to the entire 32-bit "a" register can be specified in an instruction by using the shorthand specifier "eax". For example:

mov eax, 8 writes the immediate value 8 to the 32-bit "a" register. The value 8 is sign-extended to 32-bits and written to all 32 bits of the register. A 16-bit write to the lower 16 bits of the "a" register occurs for mov ax, 8 which sign-extends the immediate value of 8 to 16 bits and writes to the lower 16 bits of the "a" register. The upper 16 bits of the "a" register are not written. If the value FFFFFFFF hex had previously been written to the "a" register, then the register stores FFFF0008 after the 16-bit write to ax, but 00000008 after the 32-bit write to eax. An 8-bit write to the low 8 bits occurs for:

mov al, 8 while the high byte of the low 16 bits are written for:

mov ah, 8

The final value stored in the 16-bit "a" register which originally contained FFFF is FF08 for the write to al, and 08FF for the write to ah.

Figure 7:
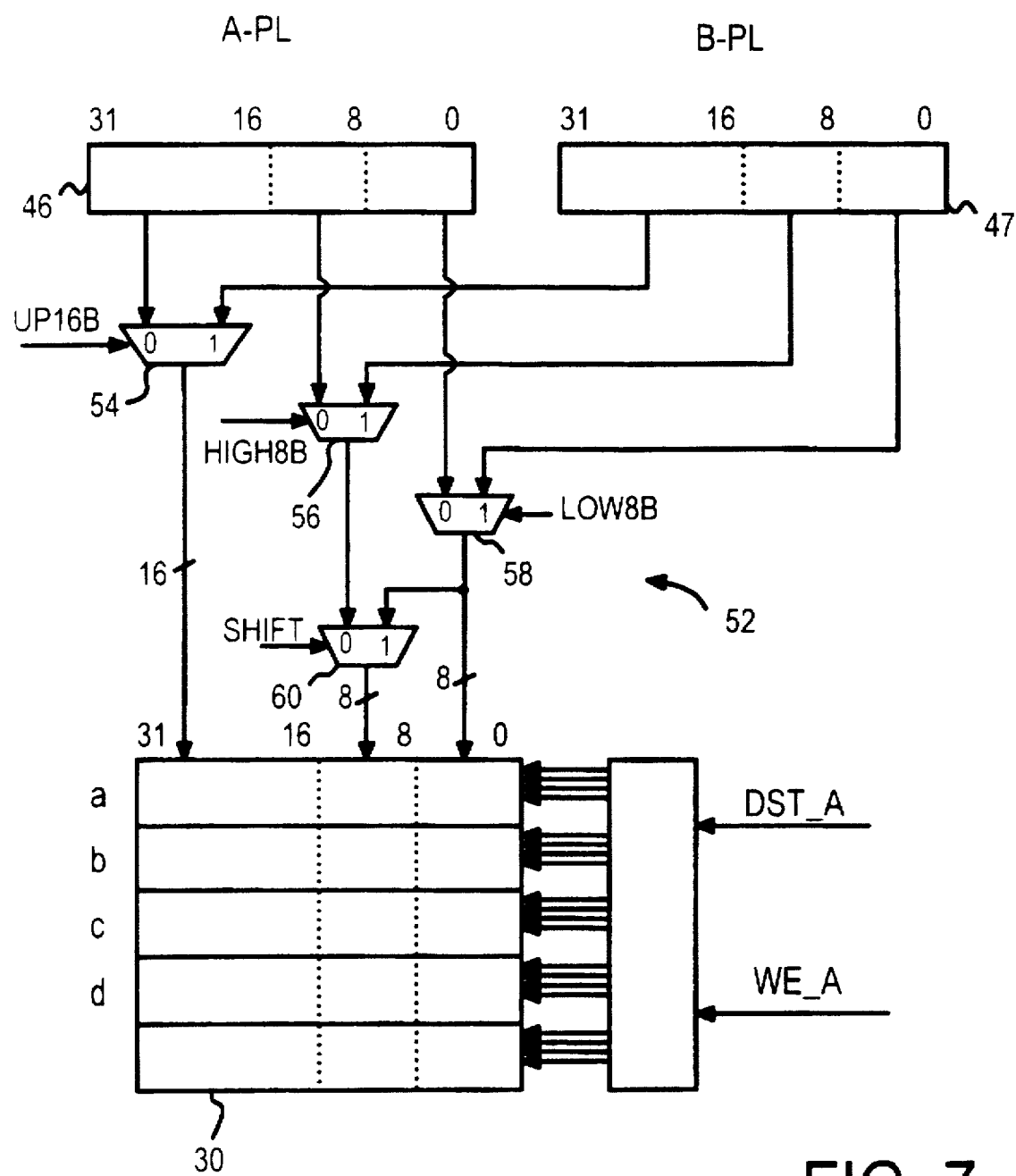
FIG. 7 is a detail of register-result merging mux 52 of FIG. 5.

FIG. 7 is a detail of register-result merging mux 52 of FIG. 5. Result data 46 from the A pipeline and result data 47 from the B pipeline are divided into three portions:

1. The upper 16 bits (bits 31:16)
2. The high byte of the low 16 bits (bits 15:8)
3. The low byte (bits 7:0)

Mux 52 contains three multiplexers for each of the three portions listed above. Mux 54 selects the upper 16 bits from either A pipeline result data 46 or from B pipeline result data 47 under control of the select signal UP16B the output of mux 54 forms the upper 16 bits of the data written to register file 30 through port A.

Mux 56 selects the high byte of the lower 16 bits from either A pipeline result data 46 or from B pipeline result data 47 under control of the select signal HIGH8B. The output of mux 56 may form the high byte of the lower 16 bits of the data written to register file 30 through port A, when mux 60 selects the output of mux 56 (SHIFT is inactive).

Mux 58 selects the low byte of the lower 16 bits from either A pipeline result data 46 or from B pipeline result data 47 under control of the select signal LOW8B. The output of mux 58 forms the low byte of the lower 16 bits of the data written to register file 30 through port A.

Mux 60 is used to shift an 8-bit result from an arithmetic-logic-unit (ALU) to the high byte. The ALU always outputs the result starting from bit 0. Thus the result from the ALU is aligned to bit 0. When the result is to be written to the high byte, the result from the ALU must be shifted up from the low byte to the high byte. Mux 60 selects the output of mux 58 to perform the shift when SHIFT is active.

MUX CONTROL LOGIC—FIG. 8

Figure 8:
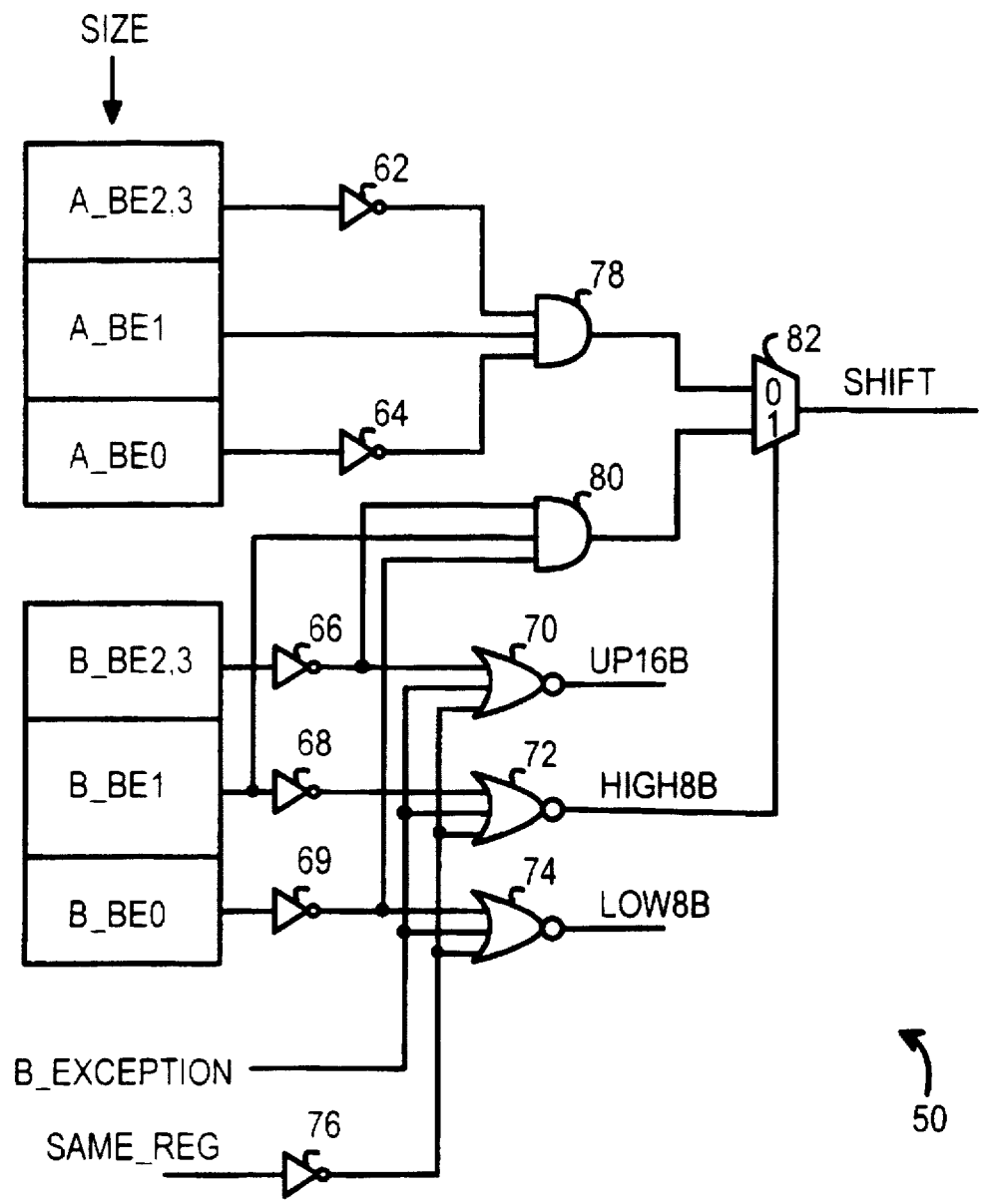
FIG. 8 is a detail the control logic part of the write enable and mux control logic.

FIG. 8 is a detail the control logic part of write enable and mux control logic 50 of FIG. 5. These control signals control muxes 54, 56, 58, 60 of FIG. 7. Size fields 44, 45 of FIG. 5 are decoded into byte enables for indicating which 8-bit bytes of result data 46, 47 are to be written. The two bytes in the upper 16 bits are always written together (single bytes are never written separately in the upper 16 bits). Thus byte enables for bytes 2 and 3 are always the same and they can be combined into one unified, 16-bit enable designated A_BE2,3 for the A pipeline, or B_BE2,3 for the B pipeline. Single byte enables are used for the high byte (A_BE1, B_BE1) and the low byte (A_BE0, B_BE0) for the low 16 bits.

When the destination registers do not match, a merged write does not occur and SAME_REG is inactive. Inverter 76 drives one of the inputs high of OR gates 70, 72, 74, which drives low the outputs UP16B, HIGH8B, and LOW8B. This causes muxes 54, 56, 58, 60 to select all bytes from the first instruction in the A pipeline for input to port A or register file 30. If less than the full 32 bits are to be written, some of the port A byte-enables are de-activated and some of the data from muxes 54, 56, 58, 60 is discarded by not being written.

When the second instruction has an exception, its data is not written to register file 30. However, the first instruction must be allowed to complete and write its result to register file 30. Thus muxes 54, 56, 58, 60 must select all the bytes from the first instruction in the A pipeline. The signal B_EXCEPTION is activated and drives one of the inputs high of OR gates 70, 72, 74, which drives low the outputs UP16B, HIGH8B, and LOW8B. This causes muxes 54, 56, 58, 60 to select all bytes from the first instruction in the A pipeline for input to port A or register file 30.

When the first instruction has an exception, write-enable logic prevents writing the first and second instruction's result to register file 30. Since the second instruction's second port to register file 30 is used, the muxes for the first instruction's port are irrelevant and can be ignored.

When SAME_REG is activated but B_EXCEPTION is not, then the select for mux 54, OR gate 70 asserts UP16B, selecting the upper 16 bits from the B pipeline when the upper byte enables B_BE2,3 are active for the second instruction. Likewise, the select for mux 56 HIGH8B is active from OR gate 72, selecting the high byte of the lower 16 bits from the B pipeline, when the high byte enable B_BE1 is active for the second instruction. OR gate 74 activates the select for mux 58 LOW8B, selecting the low byte of the lower 16 bits from the B pipeline when the low byte enable B_BE0 is active for the second instruction.

Shifting of the low byte from the ALU up to the high byte only occurs when just the high byte is being written and none of the other bytes are written. Inverters 62, 64, 66, 68, 69 invert the byte enables. The output of AND gate 78 is high when the A pipeline is writing just to the high byte and not to the low byte or the upper 16 bits. Likewise the output of AND gate 80s high when the B pipeline is writing just to the high byte and not to the low byte or the upper 16 bits. Mux 82 selects the output from AND gate 78 when the B pipeline is not writing to the high byte. In this case the B pipeline can still write to the low byte or the upper 16 bits; these are merged with the high byte write from the A pipeline.

Mux 82 selects the output from AND gate 80 when the B pipeline is writing to the high byte, giving the B pipeline priority over the A pipeline. Mux 82 then outputs the select signal SHIFT for mux 60. SHIFT is high when the selected AND gate's output is high.

WRITE-ENABLE LOGIC—FIG. 9

Figure 9:
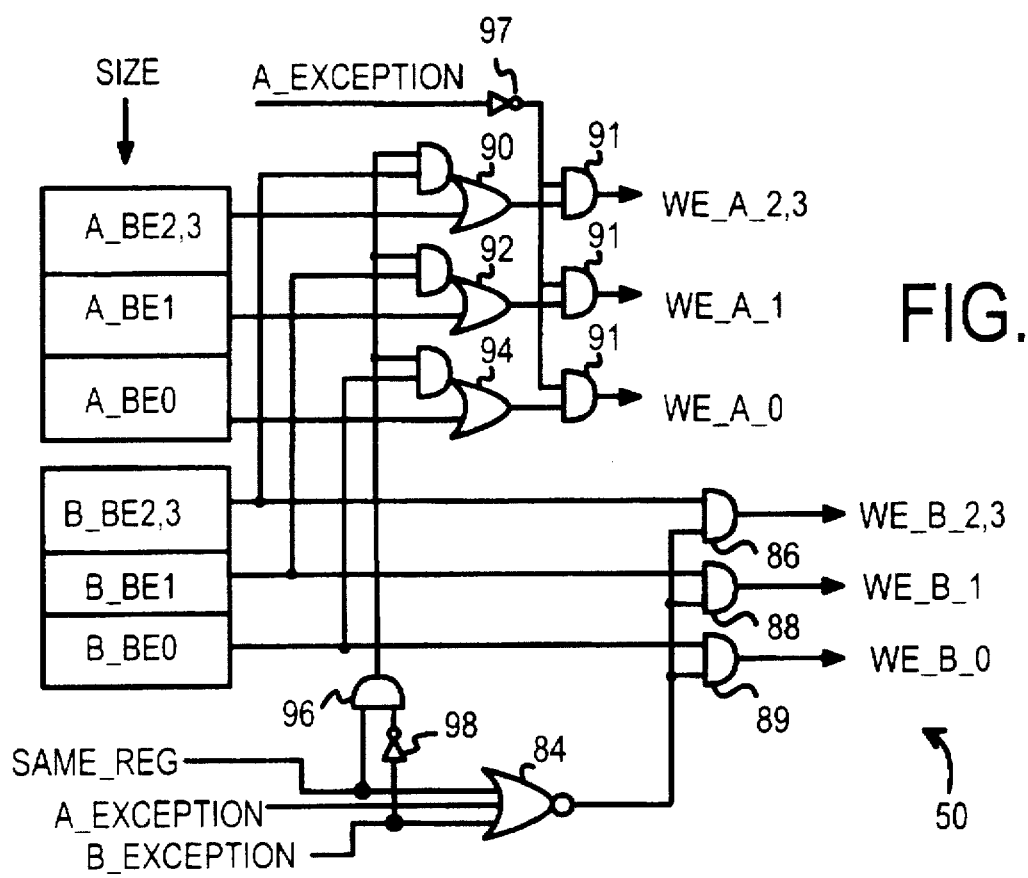
FIG. 9 is a detail of the write enable part of the write enable and mux control logic.

FIG. 9 is a detail of the write enable part of write enable and mux control logic 50 of FIG. 5. These write enables separately control writing to each of the four bytes in a 32-bit register in register file 30. Size fields 44, 45 of FIG. 5 are decoded into byte enables for indicating which 8-bit bytes of result data 46, 47 are to be written.

When the destination registers do not match, a merged write does not occur and SAME_REG is inactive (low). The low on SAME_REG is passed through AND gate 96 and causes AND_OR gates 90, 92, 94 to merely pass the A pipeline byte enables through to the write enables for port A. Also when the second instruction has an exception and thus does not write its result to register file 30, the B_EXCEPTION signal is inverted by inverter 98 and the low passed through AND gate 96 to also cause AND_OR gates 90, 92, 94 to pass the A pipeline byte enables through to the write enables for port A.

B_EXCEPTION also blocks the B pipeline's write by forcing the write enables for port B to zero using AND gates 86, 88, 89 and NOR gate 84. When a merge occurs, SAME_REG is active forcing the output of NOR gate 84 low, while AND gates 86, 88, 89 block the port B write by forcing the write enables for port B to zero. Otherwise AND gates 86, 88, 89 pass the B pipeline's byte enables to become port B's write enables.

A_EXCEPTION blocks both the A pipeline's write and the B pipeline's write, since the exception in the first instruction causes both the first and second instructions to be canceled. Inverter 97 drives a low onto the inputs of AND gates 91 to disable the A pipeline's write enables. A_EXCEPTION is also an input to NOR gate 84, forcing the B pipeline's write enables to be disabled on the A pipeline exception.

EXAMPLES

Destination-destination register dependencies prevent instruction pairing in the prior art but are paired with the invention. For example the instructions:

mov eax, 8
add eax, ebx are not paired in the prior art but are paired with the invention. The first instruction moves the sign-extended immediate value "8" to the full 32-bit eax "a" register. The second instruction adds the value in the "a" register (eax) to the value in the "b" register (ebx) and writes the sum to the "a" register. The destination of the first instruction (eax) matches the destination of the second instruction (eax). The result from the first instruction is discarded at the end of the pipeline while the second instruction's result is written to the eax register.

An exception for the second instruction causes the opposite to occur: the second instruction's result is discarded but the first instruction's result is written to the eax register. Since the exception may not be detected until late in the pipelines, the invention has the advantage that exceptions can be accounted for at the end of the pipelines using the write merging logic. The result written to the eax register can come from either instruction: normally the second instruction, but when the second instruction has an exception, the result comes from the first instruction instead.

The instructions:

mov ax, 8
add eax, ebx are also paired even though the destination registers match, since ax is the lower 16 bits of the eax register. The second instruction writes to all 32 bits of the "a" register, but the first instruction's write is not written to the register file unless an exception occurs in the second instruction. The notation "add eax, ebx" is a shorthand for "add eax, eax, ebx", where the destination is also a source. Since the second instruction uses eax as both a source and a destination, the lower 16 bits from the first instruction are routed to a source of the second instruction.

The instructions:

mov eax, 8
add ax, bx are again paired although the destinations match. The second instruction writes to only half of the "a" register (ax) while the first instruction writes to all 32 bits of the "a" register (eax). The two writes are merged at the end of the pipelines, with the lower 16 bits coming from the second instruction and the upper 16 bits from the first instruction. The lower 16 bits from the first instruction are discarded unless the second instruction has an exception.

Older code could generate the instructions:

mov al, 8
mov ah, 3 where the first instruction writes the immediate value 8 to the low byte of the 32-bit "a" register, and the second instruction writes the immediate value 3 to the high byte of the lower 16 bits of the same "a" register. Since the destinations match, the prior art would not dispatch these two move instructions together; the second instruction would be dispatched in the next clock cycle. The present invention dispatches both instructions together as a pair.

At the second to the last pipeline stage, the M/EX stage, the destination register specifiers are compared and the destination match detected. During the last pipeline stage, the W stage, the results from the two instructions are merged together. The first instruction's result is written to the low byte while the second instruction's result is written to the high byte of the lower 16 bits. The upper 16 bits are not written.

An exception in the second instruction causes just the low byte to be written. The second instruction's write of the high byte is canceled for the exception.

DESTINATION-SOURCE DEPENDENCIES REDUCED

The destination of the first instruction is compared to the source(s) of the second instruction before dispatch at the beginning of the pipelines. When a match is detected, the two instructions are blocked from pairing and the second instruction is issued in a following clock period.

Destination-source dependencies pose a problem when the destination register is written by the first instruction after the point in time when the second instruction reads the same register as its source. Bypass logic may be used to make the result of the first instruction available to the second instruction before the result is actually written to the register file.

Bypassing has been successfully used within a pipeline to provide the result of an instruction to other instructions that are in earlier stages of the pipeline. Bypassing may also be used for superscalar pairing where the instructions are in the same stage. Superscalar pair bypassing is possible when the result from the first instruction is generated before the second instruction uses it sources. Referring back to FIG. 4, when the first instruction in the A pipeline is a memory load, the cache memory is read and the result is available at the end of cache stage 36. This result may be bypassed to the second instruction in the B pipeline. The result is available at the beginning of the B pipeline's memory and execute stage 37. Thus if the second instruction is an execute instruction, it may use the bypassed result from the first instruction.

Destination-source dependencies where the first instruction is a memory load and the second instruction is an execute may use bypassing to prevent the dependency from blocking the instructions from pairing. The conditions signal to OR-AND gate 25 of FIG. 3 is pulled low when such a memory-execute destination-source pair is detected to allow the instructions to pair.

As an example, the instructions:

load eax, <mem>
inc eax can be paired despite the destination of the first instruction matching the source of the second instruction (eax). The memory operand is loaded into the C stage of the A pipeline and is bypassed to the second instruction. On the next clock cycle, the M/EX stage of the B pipeline uses the bypassed operand as its source in the increment operation.

The instructions:

inc eax
load ebx, <eax> cannot pair. The first instruction, the increment, does not generate a result until the end of the memory and execute stage. However, the second instruction needs the incremented eax value as a source to generate the memory address. The second instruction needs the result of the first instruction at the beginning of the address generate stage, two stages before the result of the first instruction is generated. Thus the instructions cannot be paired.

Other implementations of pipelines may locate the execute stage before the address generate stage. For those implementations the above case is reversed.

ALTERNATE EMBODIMENTS

Several other embodiments are contemplated by the inventors. For example the invention has been described with reference to a pair of instructions being dispatched together. The invention can easily be extended to three or more instructions being dispatched together as a group by providing additional destination-source comparators at the beginning of the pipelines. Register write merging at the end of the pipeline can be extended to three or more possible results to merge together. Persons of skill in the art will readily recognize these extensions and applications of the present invention.

The invention has been described for exceptions which occur during the execution of the second instruction. Exceptions cause the current instruction not to complete. An interrupt in the first instruction has the same effect as an exception in the second instruction since interrupts allow the current instruction to complete but cancel all following instructions.

The invention has also been described with reference to static superscalar pipelines. The first instruction is dispatched to the A pipeline while the second instruction is dispatched to the B pipeline. The invention also benefits dynamic superscalar pipelines where the first instruction is dispatched to either the A or B pipeline and the second instruction dispatched to the unused pipeline. Dynamic superscalar pipelines are useful since each pipeline can be optimized for certain types of instructions. The A pipeline can be used for executing memory-type instructions while the B pipeline used for execute and branch types of instructions.

Of course, the multiplexing and logic described herein may easily be modified or altered by those of skill in the art, or even by logic synthesis design tools.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A superscalar processor for processing two instructions in parallel comprising:
    an instruction decode and dispatch unit for decoding a pair of instructions and dispatching the pair of instructions, the instruction pair including a first instruction and a second instruction following the first instruction in an instruction stream;
    destination-source compare means, in the instruction decode and dispatch unit, for comparing a first destination of the first instruction in the instruction pair to a source of the second instruction in the instruction pair;
    a first pipeline, receiving the first instruction from the instruction decode and dispatch unit, for processing the first instruction and generating a first result;
    a second pipeline, receiving the second instruction from the instruction decode and dispatch unit, for processing the second instruction in parallel with the first pipeline processing the first instruction, the second pipeline generating a second result for the second instruction;
    a register file for storing a plurality of results and operands;
    destination compare means, coupled to the first pipeline and the second pipeline, for signaling a destination match when the first destination of the first instruction is a same register in the register file as a second destination of the second instruction; and
    destination register write means, coupled to receive the first result from the first pipeline and coupled to receive the second result from the second pipeline, for (a) writing the first result to the first destination in the register file and writing the second result to the second destination in the register file when the destination match is not signaled;
    (b) writing the second result to the second destination in the register file when the destination match is signaled and discarding the first result;
    whereby the instruction pair is dispatched and processed in parallel even when the destination match occurs.

2. The superscalar processor of claim 1 wherein the instruction decode and dispatch unit further comprises:
    inhibit means, responsive to the destination-source compare means, for canceling the second instruction when the first destination of the first instruction is the same register as the source of the second instruction, the second instruction being dispatched as a first instruction of a following clock cycle, whereby the second instruction is inhibited from pairing with the first instruction when the first destination matches the source.

3. The superscalar processor of claim 2 wherein the instruction decode and dispatch unit further comprises:
    means for decoding the first instruction into a first destination-register specifier for the first destination;
    means for decoding the second instruction into a second destination-register specifier and a source-register specifier;
    wherein each specifier identifies a register in the register file;
    the first pipeline further receiving the first destination-register specifier and the second pipeline further receiving the second destination-register specifier;
    the destination compare means receiving the first destination-register specifier from the first pipeline and receiving the second destination-register specifier from the second pipeline;
    the destination compare means including means for comparing the first destination-register specifier to the second destination-register specifier, and for signaling the destination match when the first destination-register specifier of the first instruction identifies the same register in the register file as the second destination-register specifier of the second instruction; whereby register specifiers are generated by the instruction decode and dispatch unit but compared by the destination compare means after being received from the first and second pipelines.

4. The superscalar processor of claim 3 further comprising:
    size compare means, coupled to the second pipeline, for indicating when only a second portion of a destination register in the register file is written by the second result of the second instruction; and
    write merge means, in the destination register write means and responsive to the size compare means, for writing the second result to the second portion of the destination register but writing a first portion of the first result to the destination register when the destination match is signaled, the first portion excluding the second portion, whereby portions of the first result are merged with the second result when the second result is written to only a portion of the destination register and the destination match is signaled.

5. The superscalar processor of claim 4 wherein the destination register comprises 32 data bits, the second portion being (a) a most-significant 16 bits of the 32 data bits, (b) a least-significant 8 bits of the 32 data bits, or (c) a most-significant 8 bits of a least-significant 16 bits of the 32 data bits.

6. The superscalar processor of claim 5 wherein the first instruction and the second instruction are instructions in an x86 instruction set.

7. The superscalar processor of claim 5 further comprising:

result shift means, coupled to the first pipeline, for shifting an 8-bit result from the least-significant 8 bits of the 32 data bits to the most-significant 8 bits of the least-significant 16 bits of the 32 data bits, wherein the 8-bit result is received from an arithmetic-logic-unit in the first pipeline and shifted to generate the first result, the first result written to the destination register in the register file.

8. The superscalar processor of claim 7 wherein the result shift means is also coupled to the second pipeline, the result shift means shifting an 8-bit result from the second pipeline to generate the second result, the second result written to the destination register in the register file.

9. The superscalar processor of claim 4 further comprising:

exception means, coupled to the second pipeline, for signaling an exception caused by execution of the second instruction;

the destination register write means not writing the second result to the destination register but instead writing the first result to the destination register when the exception is signaled, whereby the second instruction does not write the second result when an exception is signaled.

10. The superscalar processor of claim 2 wherein the first pipeline and the second pipeline together comprise a plurality of pipelines, a pipeline in the plurality of pipelines being dynamically allocated as the first pipeline for executing the first instruction or dynamically allocated as the second pipeline for executing the second instruction, wherein pipelines are dynamically allocated to process the first instruction or the second instruction.

11. The superscalar processor of claim 2 further comprising:

bypass means, coupled to the first pipeline and coupled to the second pipeline, for bypassing an operand loaded from memory by the first instruction in the first pipeline to a source input of the second pipeline, wherein the first pipeline comprises a memory-load stage before an execute stage in the second pipeline, the destination-source compare means further comprising:

load detect means, coupled to the instruction decode and dispatch unit, for signaling when the first instruction is a load instruction which loads an operand from memory;

the inhibit means, in response to the load detect means, not canceling the second instruction when the first destination of the first instruction is the same register as the source of the second instruction when the first instruction is a load instruction, the second instruction being dispatched with the first instruction, whereby the second instruction is not inhibited from pairing with the first instruction when the first destination matches the source but the first instruction is a load instruction.

12. A method of processing instructions in parallel in a superscalar processor, the method comprising:

decoding a first instruction into a first operation and a first destination-register specifier;

dispatching the first instruction to a first pipeline;

decoding a second instruction in parallel with decoding the first instruction, and decoding the second instruction into a second operation and a second destination-register specifier;

dispatching the second instruction to a second pipeline;

processing the first instruction and performing the first operation in a plurality of pipeline stages in the first pipeline to generate a first result and in parallel processing the second instruction and performing the second operation in a plurality of pipeline stages in the second pipeline to generate a second result;

staging the first destination-register specifier down the plurality of pipeline stages in the first pipeline as the first instruction is being processed;

staging the second destination-register specifier down the plurality of pipeline stages in the second pipeline as the second instruction is being processed;

comparing the first destination-register specifier from the first pipeline to the second destination-register specifier from the second pipeline and signaling a destination match when the first destination-register specifier matches the second destination-register specifier;

when the destination match is not signaled, writing the second result to a second register identified by the second destination-register specifier while writing the first result to a first register identified by the first destination-register specifier;

when the destination match is signaled, merging the first result into the second result to generate a merged result, and writing the merged result to the second register identified by the second destination-register specifier while not writing the first result to the first register identified by the first destination-register specifier since the first register is a same register as the second register, whereby instructions having a same destination are dispatched and processed together.

13. The method of claim 12 wherein merging the first result into the second result to generate the merged result comprises:

writing all portions of the second result to the second register; and discarding portions of the first result which overlap the second result, but writing to the second register portions of the first result which do not overlap the second result, whereby portions of the first result which do not overlap the second result are written to the second register.

14. The method of claim 13 wherein comparing the first destination-register specifier from the first pipeline to the second destination-register specifier from the second pipeline further comprises:

receiving the first destination-register specifier from a late stage in the plurality of pipeline stages in the first pipeline and receiving the second destination-register specifier from a late stage in the plurality of pipeline stages in the second pipeline, wherein the destination-register specifiers are compared after a late stage in the plurality of pipeline stages.

15. The method of claim 14 wherein the late stage executes the first operation to generate the first result, the first result not being generated before the late stage.

16. The method of claim 13 further comprising:

detecting an exception in the second pipeline while executing the second instruction;

discarding all portions of the second result when the exception is detected, whereby all portions of the first result are written to the first register when the exception is detected.

17. The method of claim 13 further comprising:

decoding a source-register specifier from the second instruction;

comparing the source-register specifier of the second instruction to the first destination-register specifier of the first instruction and generating a cancel signal when a source-destination match occurs;

canceling the second instruction and not processing the second instruction in the second pipeline when the cancel signal is generated, whereby source-destination dependencies cancel the second instruction.

18. A result merging apparatus for a processor having a plurality of execution pipelines, the apparatus comprising:

a register file having a plurality of registers, each register in the plurality of registers identified by a unique specifier, each register having 32 data bits;

first result input means, coupled to a first pipeline in the plurality of pipelines, for receiving a first result of a first instruction;

second result input means, coupled to a second pipeline in the plurality of pipelines, for receiving a second result of a second instruction, the second instruction occurring after the first instruction in a linear instruction stream, the first instruction and the second instruction being processed in parallel;

destination-compare means, receiving a first destination specifier from the first pipeline and a second destination specifier for the second instruction, for signaling a destination match when the first result and the second result are to be written to a same register in the register file;

upper multiplexer means, coupled to the first result input means and the second result input means, for selecting as an upper 16-bit output an upper 16-bit portion of the first result when the destination match is signaled and no portion of the second result is in an upper 16-bit portion of a 32-bit result, the upper multiplexer means otherwise selecting as the upper 16-bit output an upper 16-bit portion of the second result;

middle multiplexer means, coupled to the first result input means and the second result input means, for selecting as a middle 8-bit output a middle 8-bit portion of the first result when the destination match is signaled and no portion of the second result is in a middle 8-bit portion of a 32-bit result, the middle multiplexer means otherwise selecting as the middle 8-bit output a middle 8-bit portion of the second result, the middle 8-bit portion having less significance than the upper 16-bit portion;

lower multiplexer means, coupled to the first result input means and the second result input means, for selecting as a lower 8-bit output a lower 8-bit portion of the first result when the destination match is signaled and no portion of the second result is in a lower 8-bit portion of a 32-bit result, the lower multiplexer means otherwise selecting as the lower 8-bit output a lower 8-bit portion of the second result, the lower 8-bit portion having less significance than the upper 16-bit portion and less significance than the middle 8-bit portion;

write means, receiving the upper 16-bit output from the upper multiplexer means, receiving the middle 8-bit output from the middle multiplexer means, and receiving the lower 8-bit output from the lower multiplexer means, for writing to a second register identified by the second destination specifier the upper 16-bit output, the middle 8-bit output, and the lower 8-bit output when the destination match is signaled, whereby the first result and the second result are merged before writing to the register file when the destination match is signaled.

19. The apparatus of claim 18 further comprising:

first write means, coupled to the register file and coupled to receive the first result, for writing the first result to the register file in parallel to the write means writing the second result to the register file when the destination match is not signaled, whereby the register file is dual-ported.

20. The apparatus of claim 19 further comprising:

write-enable means, coupled to the first pipeline and the second pipeline, for generating write-enable signals to separately enable writing the upper 16-bit output, the middle 8-bit output, and the lower 8-bit output to the register file.

* * * * *